US009477245B1

(12) United States Patent
Yeh et al.

(10) Patent No.: US 9,477,245 B1
(45) Date of Patent: Oct. 25, 2016

(54) HIGH PERFORMANCE VOLTAGE-TO-CURRENT CONVERTER FOR LTE TRANSMITTER

(71) Applicant: TAIWAN SEMICONDUCTOR MANUFACTURING CO., LTD., Hsin-Chu (TW)

(72) Inventors: En-Hsiang Yeh, Hsin-Chu (TW); Tzu-Jin Yeh, Hsin-Chu (TW); An-Hsun Lo, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 14/942,092

(22) Filed: Nov. 16, 2015

(51) Int. Cl.
*H04B 1/40* (2015.01)
*G05F 1/46* (2006.01)
*G05F 1/56* (2006.01)
*G05F 3/26* (2006.01)

(52) U.S. Cl.
CPC ............... *G05F 1/561* (2013.01); *G05F 3/262* (2013.01); *H04B 1/40* (2013.01)

(58) Field of Classification Search
CPC ........ H04B 1/04; H04B 1/0475; H04B 1/40; H04W 52/02; G05F 1/46; G05F 1/561
USPC ............. 455/114.2, 127.1, 127.5, 296, 343.1
See application file for complete search history.

(56) References Cited

U.S. PATENT DOCUMENTS 8,447,246 B2 * 5/2013 Oliaei .................. H04B 1/0057 375/297
8,693,961 B2 * 4/2014 Oliaei .................. H03F 1/0222 455/114.2
2013/0040695 A1 * 2/2013 Yu ........................... H03F 3/193 455/550.1

OTHER PUBLICATIONS

Oliaei, O. et al., "A Multiband Mutimode Transmitter without Driver Amplifier", 2012 IEEE International Solid-State Circuits Conference/Session 9/Wireless Transceiver Techniques/9.2, pp. 164-166.
Codega, N. et al., "A Current-Mode, Low Out-of-Band Noise LTE Transmitter With a Class-A/B Power Mixer", IEEE Journal of Solid-State Circuits, Jul. 2014, 49(7):1627-1636.

* cited by examiner

*Primary Examiner* — Blane Jackson
(74) *Attorney, Agent, or Firm* — Duane Morris LLP

(57) ABSTRACT

A voltage-to-current converter is disclosed. The voltage to current converter includes a converter circuit having an input node, an amplified signal node and an output. The input node is configured to receive a sinusoidal voltage signal and the output is configured to provide a half-wave current signal. A transistor having a gate, a source, and a drain is coupled to the input node. The input node is coupled to one of the source or the drain. The amplified signal node is coupled to the gate. A process tracking stabilizer is coupled to the transistor at the source or the drain not coupled to the input node. The process tracking stabilizer is configured to generate a control voltage for the transistor. The control voltage is configured to maintain a predetermined non-zero voltage at the input node of the converter circuit during a negative cycle of the sinusoidal voltage signal.

20 Claims, 9 Drawing Sheets

HIGH PERFORMANCE VOLTAGE-TO-CURRENT CONVERTER FOR LTE TRANSMITTER

BACKGROUND

Radiofrequency (RF) transmission structures utilize voltage-to-current (V2I) converters to convert a full-wave voltage input to a half-wave current output for transmission over an RF channel, such as wireless transmission. For example, Long-Term Evolution (LTE) utilizes one or more V2I converters during radio operations, such as transmission or reception of signals.

In an ideal (e.g., theoretical) case, the input of the V2I converter has a high impedance such that substantially no current flows into the V2I converter. The lack of current flow generates a virtual ground at the input, which causes the input to act as though it were coupled to ground (e.g., the voltage at the input is effectively zero for the purpose of calculating the current generated by one or more additional circuit elements). The virtual ground provides linearity to the V2I converter. Conventional V2I systems are unable to provide a virtual ground during a negative cycle of a full-wave input, resulting in non-linearity when the output waveform is close to zero. FIG. 1 illustrates one embodiment of a typical non-linear output of a V2I conversion circuit. Conventional V2I converters lack a good virtual ground, resulting in a current output 50 having a non-linear portion 52 when the voltage input signal is close to zero (e.g., transitioning to or from a negative cycle of the input voltage signal). The ideal waveform 54 is shown as a dashed line and represents a theoretical output wave free of non-linearity. Some conventional V2I systems can provide linearity within a narrow bandwidth, but cannot provide high linearity and high performance over a large bandwidth. Conventional V2I systems include process variations that result in the output signal falling below the quiescent current 56 of the V2I converter. Additional variations and non-linearity is introduced when the output signal falls below the quiescent current 56.

BRIEF DESCRIPTION OF THE DRAWINGS

Aspects of the present disclosure are best understood from the following detailed description when read with the accompanying figures. It is noted that, in accordance with the standard practice in the industry, various features are not necessarily drawn to scale. In fact, the dimensions of the various features may be arbitrarily increased or reduced for clarity of discussion.

DETAILED DESCRIPTION OF EXEMPLARY EMBODIMENTS

Figure 1:
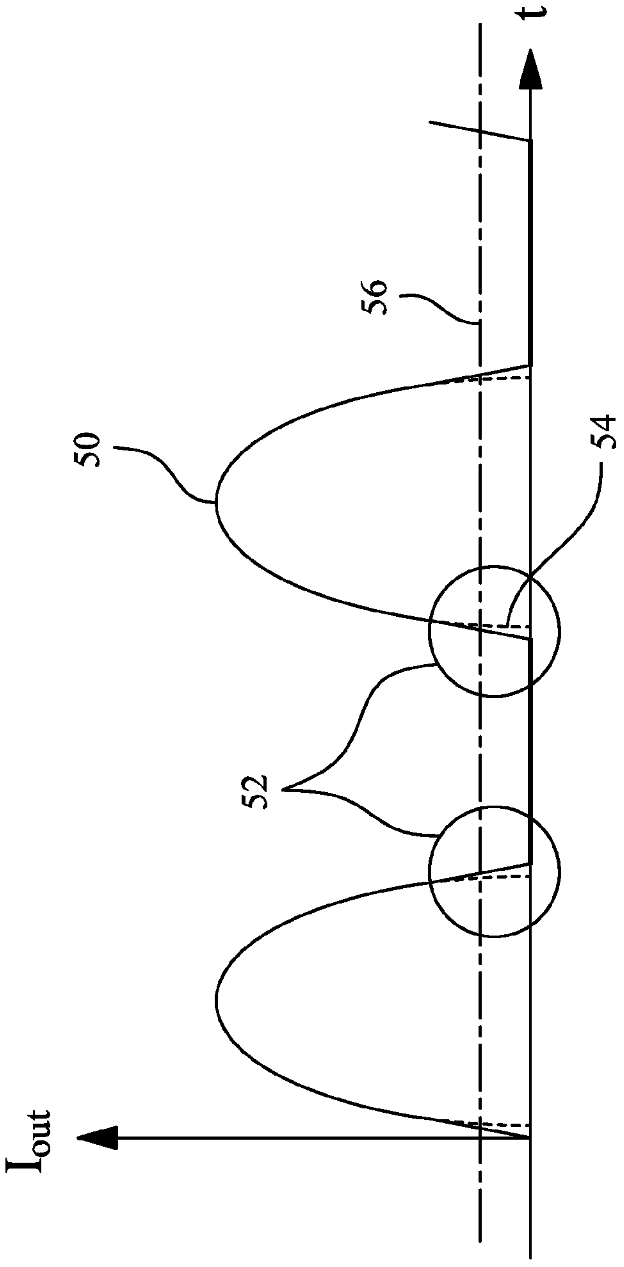
FIG. 1 (PRIOR ART)
FIG. 1 is a chart illustrating a half-wave current output of a conventional V2I converter having non-linear portions corresponding to transition periods (or zero crossings) of a voltage input signal.

The following disclosure provides many different embodiments, or examples, for implementing different features of the subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In various embodiments, a voltage-to-current converter is disclosed. The voltage to current converter includes a converter circuit having an input node, an amplified signal node and an output. The input node is configured to receive a sinusoidal voltage signal and the output is configured to provide a half-wave current signal. A transistor having a gate, a source, and a drain is coupled to the input node. The input node is coupled to one of the source or the drain. The amplified signal node is coupled to the gate. A process tracking stabilizer is coupled to the transistor at the source or the drain not coupled to the input node. The process tracking stabilizer is configured to generate a control voltage for the transistor. The control voltage is configured to maintain a predetermined non-zero voltage at the input node of the converter circuit during a negative cycle of the sinusoidal voltage signal.

Figure 2:
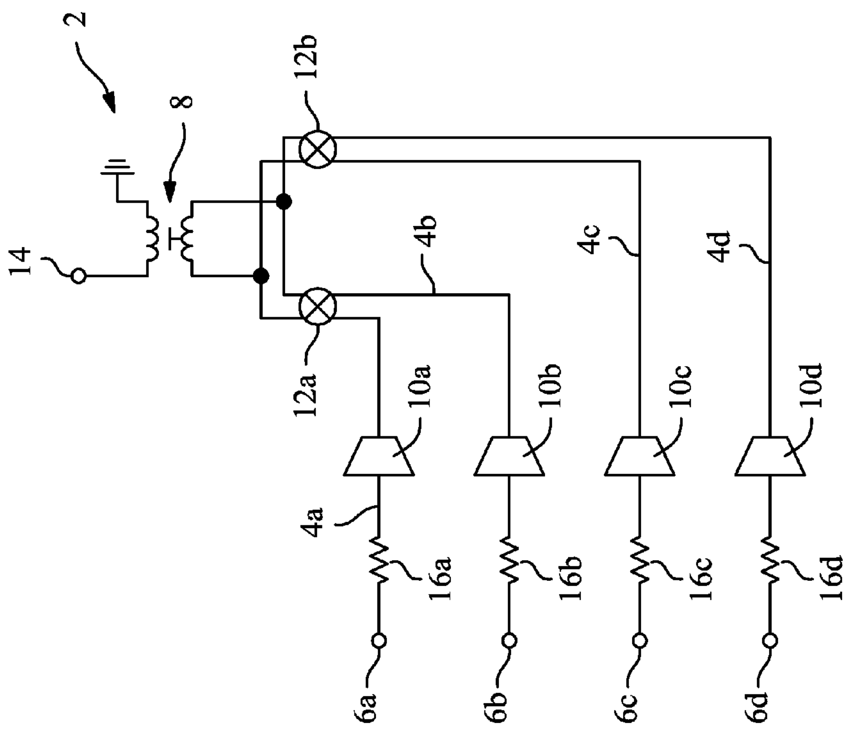
FIG. 2 illustrates an RF transceiver including a plurality of voltage-to-current converters, in accordance with some embodiments.

FIG. 2 illustrates a radiofrequency (RF) transceiver 2 having a plurality of voltage-to-current (V2I) converters 10*a*-10*d*, in accordance with some embodiments. The transceiver 2 includes a plurality of circuit paths 4*a*-4*d*. In some embodiments, the plurality of circuit paths 4*a*-4*d* comprise transmission paths and/or receiving paths. Each of the plurality of circuit paths 4*a*-4*d* includes a voltage node 6*a*-6*d* coupled to a wireless transformer 8 through a plurality of resistors 16*a*-16*d* and V2I converters 10*a*-10*d*. The RF output 14 is configured to transmit and/or receive RF signals through an RF channel. In some embodiments, one or more frequency converters 12*a*, 12*b* are coupled in series with the plurality of circuit paths 4*a*-4*d*. The frequency converters 12*a*, 12*b* convert a first frequency of a received signal to a second frequency. For example, in the case of a transmission path, the frequency converters 12*a*, 12*b* can convert a first frequency of an input current signal to a second frequency corresponding to the frequency of the RF output 14. As another example, in the case of a receiving path, the frequency converters 12$a$, 12$b$ can convert a first frequency of a signal received by the transformer 8 to a frequency receivable by the V2I converters 10$a$-10$d$.

Figure 3:
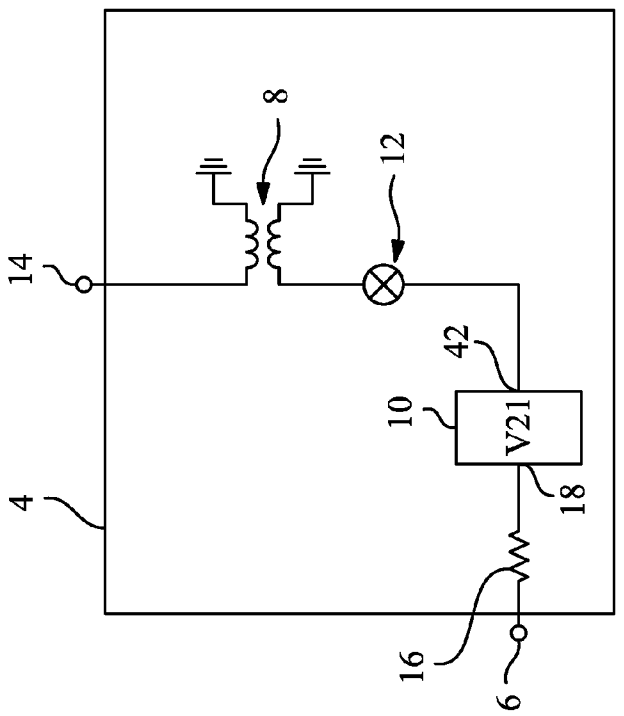
FIG. 3 illustrates a current path of a first voltage-to-current converter of the RF transceiver of FIG. 2, in accordance with some embodiments.

FIG. 3 illustrates a transmission circuit path 4 of the RF transceiver 2. The transmission circuit path 4 includes an input resistor 16 coupled in series between an input 6 and the V2I converter 10. A frequency converter 12 is coupled between the V2I converter 10 and the transformer 8. An input voltage is received at the input node 6. The input voltage is provided to the V2I converter 10 through the resistor 16. The V2I converter 10 converts a full-wave voltage input received at the input node 6 (e.g., the input voltage) to a half-wave current output signal (e.g., output current) at the output node 42. As discussed in further detail below, the V2I converter 10 maintains a good virtual ground during the entire cycle of the input voltage that allows the V2I converter 10 to produce an output current that is substantially free from non-linearities. The output current is provided to the transformer 8 for transmission over an RF channel 14.

Figure 4:
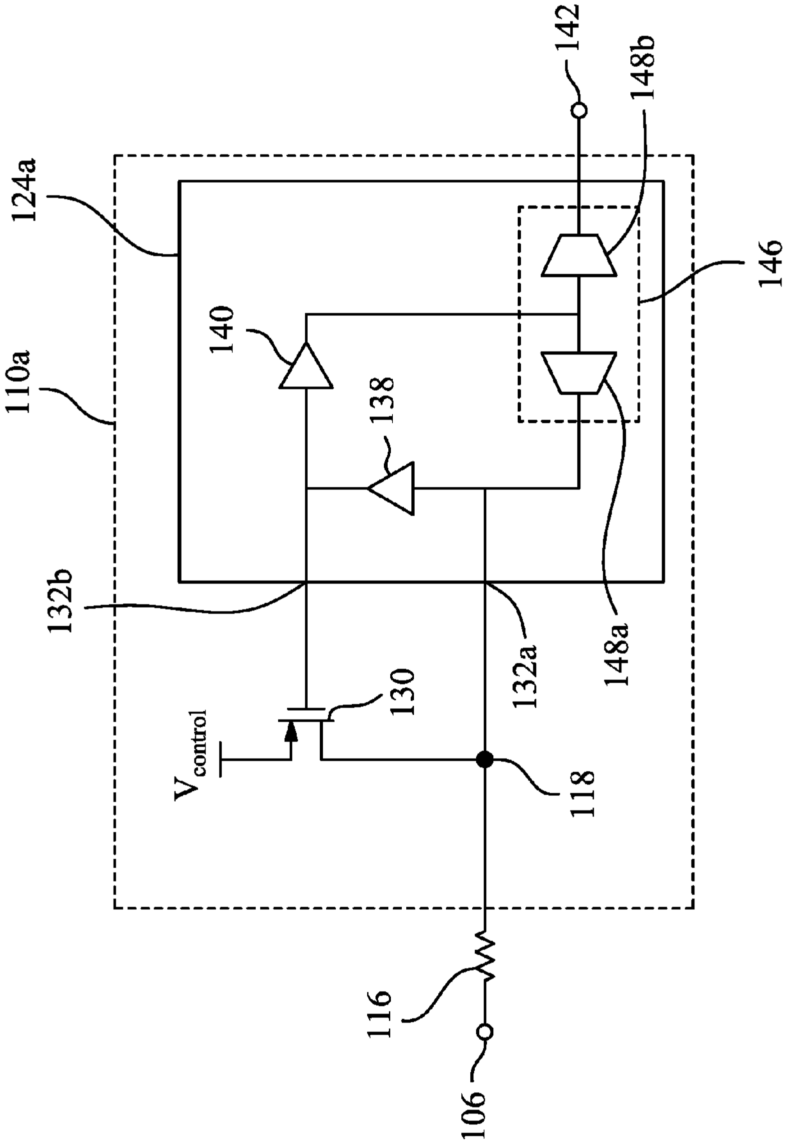
FIG. 4 illustrates a voltage-to-current converter having a virtual ground, in accordance with some embodiments.

FIG. 4 illustrates a voltage-to-current converter 110$a$ having a good virtual ground over an entire cycle of an input voltage. The voltage-to-current converter 110$a$ receives an input voltage at an input node 106. The input node 106 is coupled to node 118 through an input resistor 116. Node 118 is coupled to an input node 132$a$ of the converter circuit 124$a$ and a transistor 130. The transistor 130 is coupled to node 118 at one of a source or a drain. The transistor 130 can be any suitable transistor, such as, for example, an NMOS and/or a PMOS. In the illustrated embodiment, the transistor 130 is a PMOS transistor having a drain coupled to node 118. The source of transistor 130 is coupled to a control voltage $V_{control}$. As discussed in more detail below with respect to FIGS. 5-7, in some embodiments, the control voltage $V_{control}$ is generated by a process tracking stabilizer circuit 126. A gate of the transistor 130 is coupled to an amplified signal node 132$b$ of the converter circuit 124. The transistor 130 provides a sourcing current at node 118 during a negative cycle of the input voltage, generating a virtual ground in the converter circuit 124$a$ during the entire cycle of the input voltage, as discussed in further detail below.

For example, in the illustrated embodiment, a sourcing current is provided at node 118 when the gate-to-source voltage ($V_{gs}$) exceeds a threshold voltage of the transistor 130. The gate voltage of the transistor 130 is equal to the voltage of an amplified signal at node 132$b$ of the converter circuit 124$a$. The source voltage is the control voltage $V_{control}$. When $V_{gs}$ exceeds the threshold voltage, the transistor 130 enters a linear operating mode, allowing a sourcing current to flow from the source to the drain. The sourcing current compensates for current drawn by the converter circuit 124$a$ as the voltage input transitions to and/or from the negative portion of the cycle. In this way, the transistor 130 maintains a linear operating mode and/or a saturation operating mode during the negative cycle of the input voltage. The sourcing current is automatically adjusted by $V_{gs}$ to maintain a stable current and voltage at the input node 132$a$, resulting in a stable virtual ground for the V2I converter 110 (e.g., current at node 118 is maintained at substantially zero by the sourcing current to prevent non-linearity in the output current waveform). In some embodiments, the voltage at node 118 is maintained at a minimum non-zero value to prevent the converter circuit 124 from having a negative current at input node 132$a$, and therefore preventing non-linearity in the output current waveform. In other embodiments, additional and/or different transistor types may be coupled in different configurations, such as, for example, an NMOS transistor having source and drain connections opposite of the PMOS transistor discussed above. The additional and/or different transistor types are configured to provide a good virtual ground during the entire cycle of the voltage input signal by providing a sourcing current and/or voltage as needed to compensate for a potential current draw of the converter circuit 124 during a transition and/or negative cycle of the voltage input.

In some embodiments, the converter circuit 124$a$ includes an input node 132$a$ and an amplified signal node 132$b$. The input node 132$a$ receives the voltage input signal from the voltage node 118. The amplified signal node 132$b$ is coupled to the gate of the transistor 130. In some embodiments, a voltage amplifier 138 is coupled between the input node 132$a$ and the amplified signal node 132$b$. The voltage amplifier 138 amplifies the input voltage received at the input node 132$a$ by a positive gain. In some embodiments, the voltage amplifier 138 is coupled to a DC level shifter 140. The output of DC level shifter 140 provides an input to a voltage-to-current amplifier 146. The voltage to current amplifier 146 is configured to convert and amplify a full-wave voltage input signal at the input node 132$a$ to a half-wave current output signal at its output node 142.

In some embodiments, the current amplifier 146 includes a first MOS (metal-oxide semiconductor) device 148$a$ and a second MOS device 148$b$. The second MOS device 148$b$ is M times larger than the first MOS device, where M is an integer greater than or equal to two. The second MOS 148$b$ device mirrors a signal received at the first MOS 148$a$ device, amplified M times. In some embodiments, the DC level shifter 140 is coupled to the first and second MOS devices 148$a$, 148$b$ to provide a feedback signal from the input node 132$a$. In some embodiments, the output of the V2I converter circuit is governed by the equation:

$$I_{out} = M * \frac{V_{in}}{R} \quad \text{(Equation 1)}$$

wherein M is the size difference between the first and second MOS devices 148$a$, 148$b$ (e.g., the size ratio of the current mirror 146), $V_{in}$ is the input voltage at input node 104, and R is a resistance of the input resistor 116. The output current $I_{out}$ is provided to an transformer (for example, transformer 8 illustrated in FIGS. 2 and 3) for transmission over an RF channel. In some embodiments, the first MOS device 148$a$ is coupled to the input node 132$a$ and receives the voltage input signal from node 118. As discussed in more detail below with respect to FIG. 5, in some embodiments, the first MOS device 148$a$ and/or the second MOS device 148$b$ can comprise any suitable transistor, such as, for example, an NMOS, a PMOS, and/or any other suitable transistor.

Figure 5:
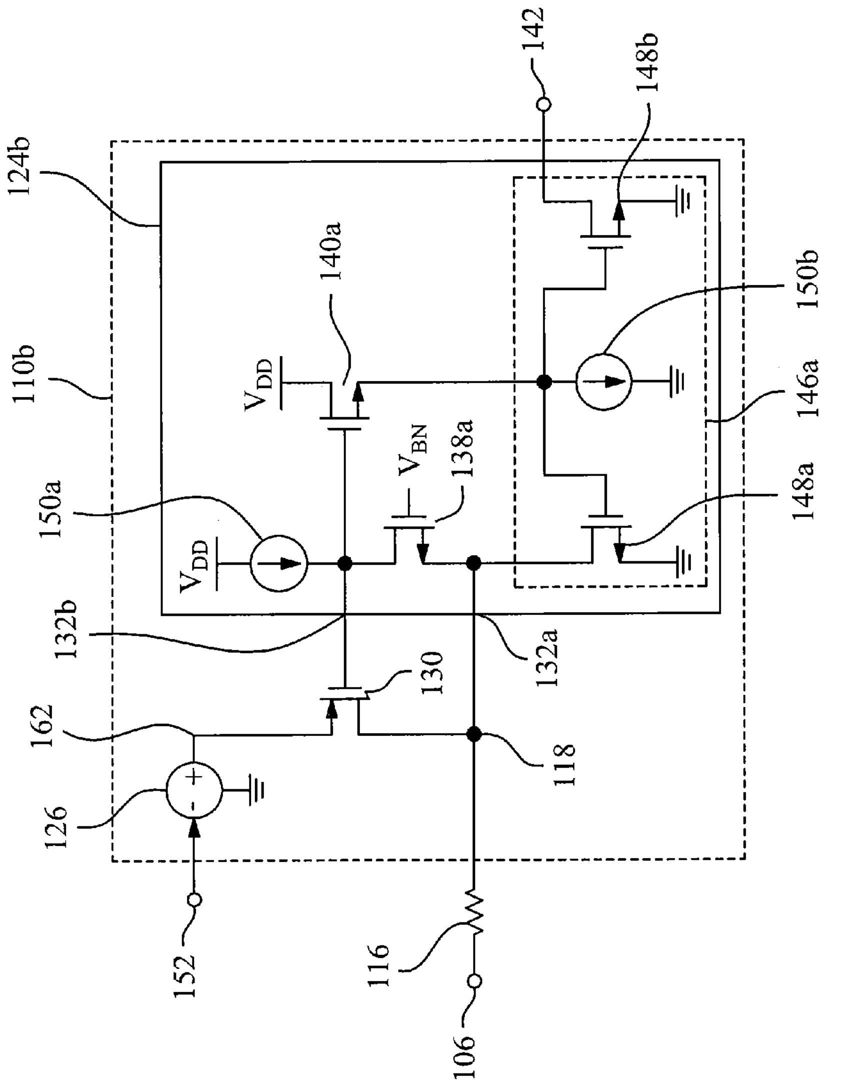
FIG. 5 illustrates a voltage-to-current converter including a process tracking stabilizer, in accordance with some embodiments.

FIG. 5 illustrates one embodiment of the voltage-to-current converter 110$b$ including a converter circuit 124$b$ having a plurality of NMOS devices, in accordance with some embodiments. The V2I converter 110$b$ has some similar features to the V2I converter circuit 110$a$ discussed above with reference to FIG. 4, and the description of such similar features is not repeated herein. In some embodiments, the converter circuit 124$b$ includes a plurality of transistors, such as NMOS, PMOS, and/or any combination thereof. A first transistor 138$b$ is coupled between the input node 132$a$ and the amplified signal node 132$b$. The first transistor 138$b$ amplifies the signal received at the input node 132$a$ and provides the amplified signal to the amplified signal node 132*b*. In some embodiments, the gate of the first transistor 138*a* is coupled to a voltage source $V_{BN}$. $V_{BN}$ is a constant input voltage provided by an external voltage source. The value of $V_{BN}$ is selected to operate the first transistor 138*a* at a saturation region such that the first transistor 138*a* operates as a common-gate amplifier.

In some embodiments, a second transistor 140*a* is coupled to the amplified signal node 132*b*. The second transistor 140*a* is a DC level shifter. The source of the second transistor 140*a* is coupled to the input of a current mirror 146*b*. The drain of the second transistor 140*a* is coupled to a voltage source. The value of the voltage source is selected to operate the second transistor 140*a* at a saturation region. For example, in some embodiments, the voltage source is a supply voltage $V_{DD}$. The current mirror 146*b* includes a first mirror transistor 148*a* and a second mirror transistor 148*b*. The second mirror transistor 148*b* is M sizes bigger than the first mirror transistor 148*a* (i.e., the size ratio of the current mirror 146*b*), where M is an integer greater than or equal to two. The current mirror 146*a* includes a current source 150*b* that provides an input current for amplifying the signal received at the input 132*a* M times at the output 142. Although an embodiment is illustrated utilizing a plurality of NMOS transistors and current sources, it will be appreciated that the converter circuit 124*b* can include any suitable combination of circuit elements to convert a voltage input at input node 132*a* to a half-wave current output at output node 142. In the illustrated embodiment, the gate of the transistor 130 is coupled to the amplified signal node 132*b* and the drain of the transistor 130 is coupled to the input node 132*a*. The connections between the transistor 130 and nodes 132*a*, 132*b* prevents current from flowing into the V2I converter 110 (e.g., provides a virtual ground that causes the input node 132*a* to appear to be at zero volts for the purpose of calculating an input current), thereby providing a very high input impedance, during both the positive and negative cycles of the full-wave sinusoidal input voltage. The transistor 130 is configured to provide a control voltage ($V_{control}$) at node 118 when the input voltage received at node 106 is transitioning to a negative cycle of the voltage. The control voltage provided to node 118 maintains a minimum fixed voltage at the input node 132*a* of the converter circuit 124. By maintaining a minimum fixed voltage, the input node 132*a* never reaches zero (or a negative value) and does not experience the non-linearity that occurs as traditional converter circuits approach a zero input. In some embodiments, the minimum voltage maintained at the input node 132*a* is configured such that the minimum current output at node 142 is equal to a quiescent current of the V2I converter 110.

In some embodiments, a process tracking stabilizer 126 is configured to generate a constant quiescent current $I_q$ to provide stable power efficiency during RF transmission. A quiescent current $I_q$ is the current generated by the V2I converter 110 when the circuit is driving no load and the inputs are not cycling. In some embodiments, a process tracking stabilizer 126 is coupled to the source of the transistor 130. As discussed in more detail below with respect to FIG. 6, in some embodiments, the process tracking stabilizer 126 tracks the gate-to-source voltage $V_{gs}$ of the transistor 130. The process tracking stabilizer 126 receives a control current through a control input terminal 152. The control current is selected such that a control voltage output, $V_{control}$, of the process tracking stabilizer 126 compensates for process variations and provides a stable quiescent current $I_q$. The quiescent current affects the output of the V2I converter 110 according to the equation:

$$I_{out} = M * \frac{V_{in}}{R} + I_q \text{ when } I_{out} \geq 0\text{; otherwise } I_{out} = 0 \quad \text{(Equation 2)}$$

wherein M is a size ratio of the converter circuit 124, $V_{in}$ is an input voltage at input 106, R is a resistance of the input resistor 116, and $I_q$ is the quiescent current of the V2I converter 110*b*. The output current $I_{out}$ is provided to an transformer (for example, transformer 8 illustrated in FIGS. 2 and 3) for transmission over an RF channel. As shown in equation (2), the quiescent current $I_q$ sets the conducting cycle θ of $I_{out}$. For $I_{out}$ θ=360 degree, we set Iq equal the input signal amplitude. For $I_{out}$ θ=180 degree, we set Iq=0. (e.g., if $V_{in}$ is an sinusoidal waveform, $I_{out}$ is an 180 degree half-cycle sinusoidal waveform when we set Iq=0.) A shorter conducting cycle θ increases power efficiency, given by η=(output power)/(DC power consumption), but linearity is decreased. Conversely, a longer conducting cycle θ decreases power efficiency η but improves linearity. The stable quiescent current $I_q$ contributes to a stable power efficiency, linear output current $I_{out}$ at the output node 142 of the V2I converter 110*b*.

Figure 6:
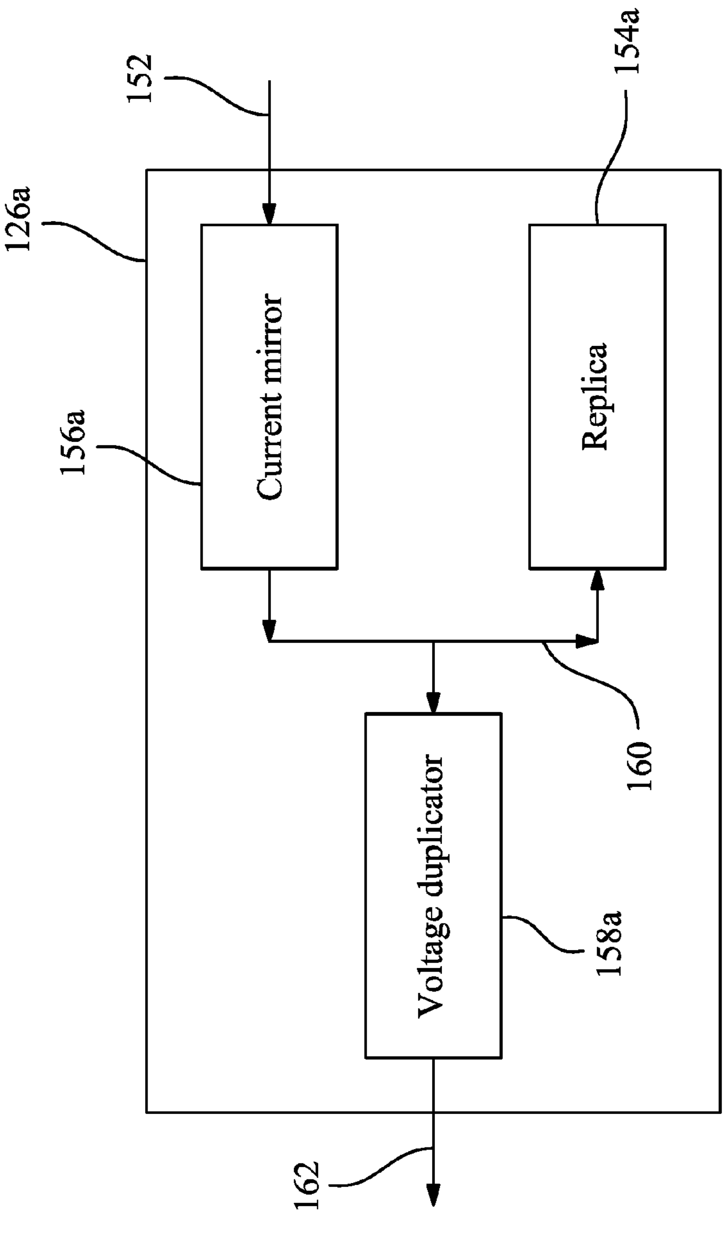
FIG. 6 illustrates a process tracking stabilizer having a replica circuit, a current mirror, and a voltage duplicator, in accordance with some embodiments.

FIG. 6 illustrates one embodiment of a process tracking stabilizer 126*a* including a replica circuit 154*a*, a current mirror 156*a*, and a voltage duplicator 158*a*. The replica circuit 154*a* substantially duplicates the converter circuit 124*a* or 124*b*, and the transistor 130. For example, in some embodiments, the replica circuit 154*a* is configured to generate a voltage substantially equal to the gate-to-source voltage (or drain-to-source voltage) of the transistor 130. For example, in some embodiments, the replica circuit 154*a* is configured to generate a voltage representative of the gate-to-source voltage of the transistor 130. The replica circuit 154 receives an input from a current mirror 156*a*. The current mirror 156*a* receives a control current at node 152. The current mirror 156*a* mirrors the control current at node 160. The voltage duplicator 158*a* generates a control voltage, $V_{control}$ at output node 162.

Figure 7:
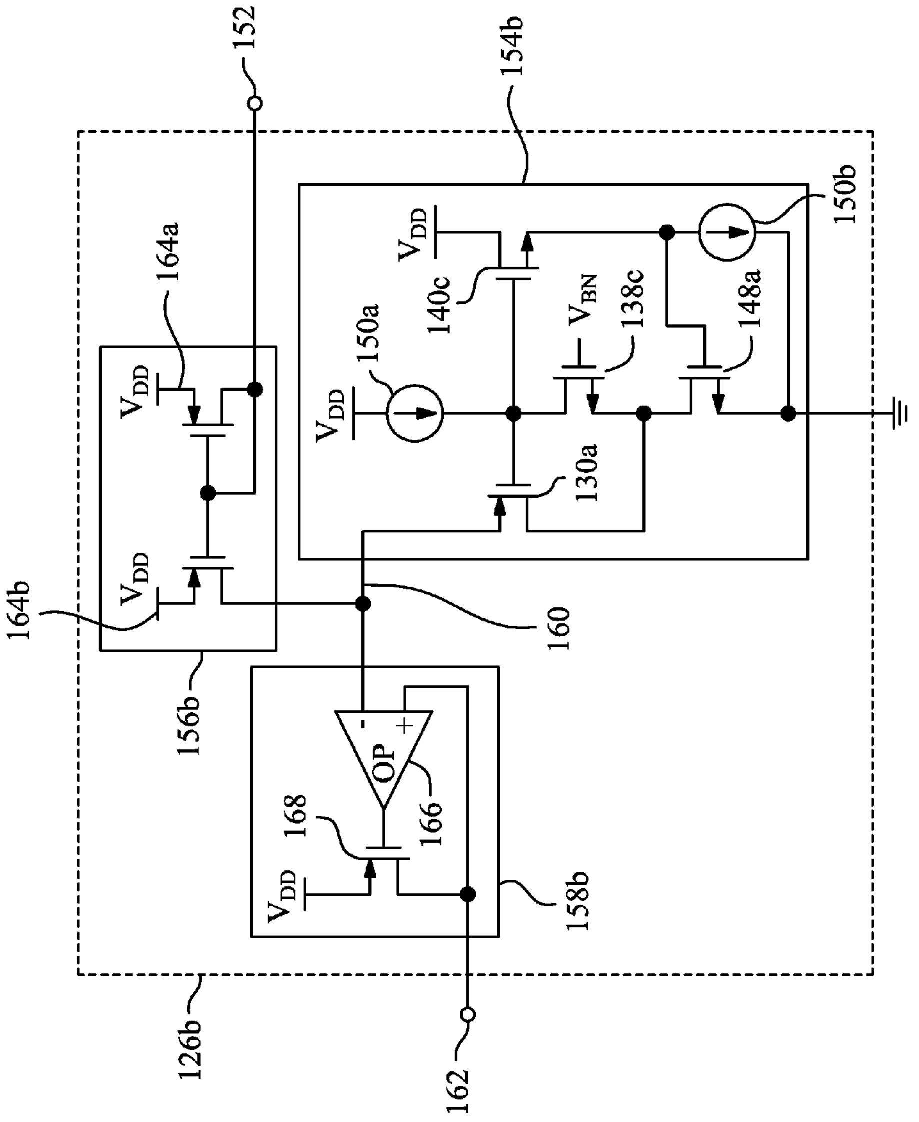
FIG. 7 illustrates a process tracking stabilizer including a replica circuit, a current mirror, and a voltage duplicator, in accordance with some embodiments.

FIG. 7 illustrates one embodiment of a process tracking stabilizer 126*b* showing exemplary embodiments of a replica circuit 154*b*, a current mirror 156*b*, and a voltage duplicator 158*b*. The replica circuit 154*b* includes a replica virtual ground transistor 130*a*, a replica amplification transistor 138*c*, a replica DC level shifter transistor 140*c*, and a replica first current mirror transistor 148*a*. The second mirror transistor 148*b* is not replicated, as the replica circuit 154*b* is not configured to generate an output current. The replica circuit 154*b* includes a plurality of current sources 150*a*, 150*b* replicating the current sources of the converter circuit 124. In some embodiments, the replica circuit 154*b* includes identical circuit elements as the conversion circuit 124. In some embodiments, the replica circuit 154*b* comprises substantially different elements than the converter circuit 124, which replicate the functionality of the converter circuit 124 without replicating the physical circuits. The replica circuit 154*b* generates a source voltage at node 160. In some embodiments, the node 160 is a PMOS source voltage node. The voltage at the source node 160 tracks the process variations of the converter circuit 124 and the transistor 130 of FIGS. 4 and 5, for example.

In some embodiments, a current mirror 156*b* is coupled to the replica circuit 154*b* at node 160. The current mirror 156*b* is configured to mirror a control current received at a control signal input 152. The current mirror 156*b* can include any suitable circuit for mirroring the control current. For example, in some embodiments, the current mirror 156*b* includes a first transistor 164_a_ and a second transistor 164_b_. The gate of each transistor 164_a_, 164_b_ is coupled to the control input node 152. In the illustrated embodiment, the transistors 164_a_, 164_b_ are PMOS transistors, although it will be appreciated that any suitable transistors may be used. The source of each of the transistors 164_a_, 164_b_ is coupled to a supply voltage $V_{DD}$. The drain of the first transistor 164_a_ is coupled to the control signal input 152 and the drain of the second transistor 164_b_ is coupled to node 160. In embodiments including NMOS transistors, the connections to the source and drain of each of the transistors 164_a_, 164_b_ can be reversed.

In some embodiments, a voltage duplicator 158_b_ is coupled to the node 160. The voltage duplicator 158_b_ is configured to duplicate the voltage at node 160 at the output 162. The voltage duplicator 158_b_ can include a single-stage operational amplifier 166 and a transistor 168. The output of the process tracking stabilizer 126_b_ is variable to correct for fluctuations (e.g., process variations) in the source voltage of the transistor 130. The transistor 168 can be any suitable transistor, such as, for example, a PMOS or an NMOS transistor. The output node 162 is coupled to the transistor 130 (see FIG. 4). In some embodiments, the output of the op-amp 166 is coupled to the gate of the transistor 168. A source or a drain of the transistor 168 is fed back and coupled to the positive input of the op-amp 166 and the output node 162 to provide a stable output control voltage $V_{control}$. As shown in FIG. 7, the negative input of the op-amp 166 is coupled to node 160. Various nodes of the process tracking stabilizer 126_b_ are connected to a supply voltage ($V_{DD}$) or ground, as shown in FIG. 7.

Figure 8:
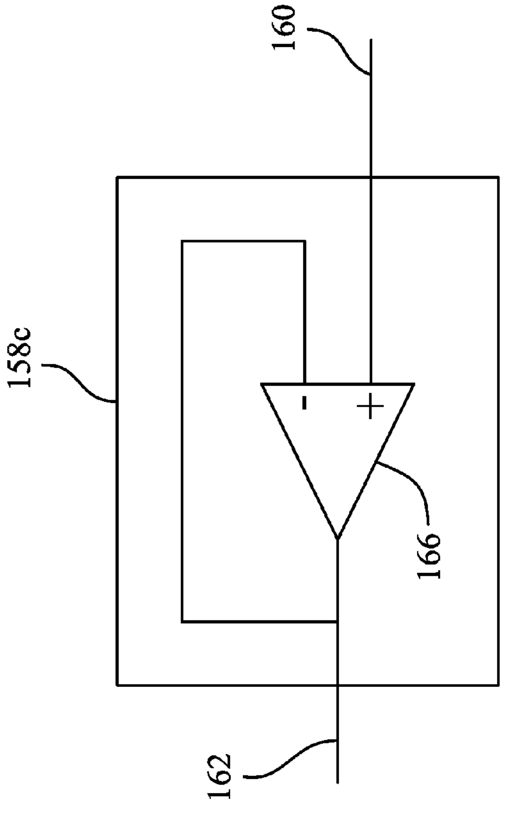
FIG. 8 illustrates a voltage duplicator, in accordance with various embodiments.

FIG. 8 illustrates a voltage duplicator 158_c_, in accordance with some embodiments. The voltage duplicator 158_c_ illustrates an alternative embodiment of the voltage duplicator 158_b_. The voltage duplicator 158_c_ omits the transistor 168 and couples the output of the op-amp 166 to the negative input to provide a closed-loop feedback for stabilizing the output voltage at the output node 162 of the op-amp 166. In this way, the voltage duplicator 158_c_ generates a stable control voltage $V_{control}$ at the output node 162. The output node 162 is coupled to one of the source or the drain of the transistor 130 (FIG. 4 or FIG. 5) to correct for process variations of the V2I converter 110_a_ or 110_b_ during operation.

Figure 9A:
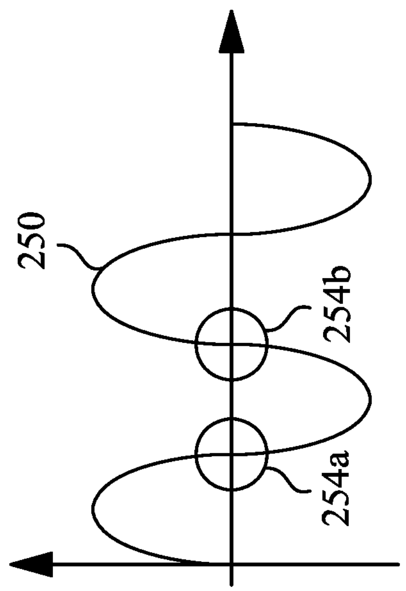
FIGS. 9A and 9B are charts illustrating a full-wave voltage input and a half-wave current output, respectively, of the voltage-to-current converter of FIG. 5, in accordance with various embodiments.
Figure 9B:
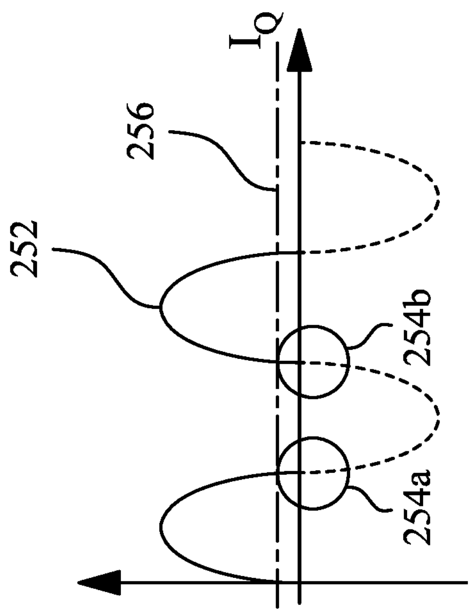

FIGS. 9A and 9B are charts illustrating a full-wave voltage input 250 (FIG. 9A) and a half-wave current output 252 (FIG. 9B) of a voltage-to-current converter 110, in accordance with various embodiments. As shown in FIG. 9B, the half-wave current output 252 is linear in portions 254_a_, 254_b_, corresponding to portions of the full-wave voltage input 250 that are near a zero crossing (e.g., transitioning to and/or from a negative value). As discussed above, the transistor 130 is configured to provide a feedback loop when the input voltage received at node 106 is transitioning to a negative cycle of the input voltage. During the positive cycle of the input voltage, the feedback loop from node 132_a_ to voltage amplifier 138 to DC level shifter 140 to first MOS device 148_a_ to node 132_a_ (see FIG. 4) maintains a fixed voltage at the input node 132_a_ of the converter circuit 124. During the negative cycle of the input voltage, the feedback loop from node 132_a_ to voltage amplifier 138 to node 132_b_ to transistor 130 to node 118 (see FIG. 4) maintains a fixed voltage at the input node 132_a_ of the converter circuit 124. The transistor 130 maintains virtual ground at node 118 and node 132_a_ during the negative cycle of the full-wave voltage input 250. Thus, the previous mentioned two feedback loops maintains virtual ground at node 118 and node 132_a_ during both positive and negative voltage cycles. By maintaining a fixed voltage, the input node 132_a_ never reaches zero (or a negative value) and does not experience the non-linearity that occurs as traditional converter circuits approach a zero input. In some embodiments, when there is no input voltage Vin at node 106, a fixed voltage maintained at the input node 132_a_ is configured such that the fixed current output at node 142 (FIG. 5) is equal to a quiescent current $I_q$ of the V2I converter 110_b_. The process tracking stabilizer 126 is configured to control the sourcing voltage provided by the transistor 130 to provide a stable quiescent current 256. As discussed above, the quiescent current $I_q$ is added to the output signal of the converter circuit 124 and reflects the conducting cycle of output signal 252 be larger than 180 degrees, thus, improved linearity can be achieved.

In various embodiments, a voltage-to-current converter is disclosed. The voltage to current converter includes a converter circuit having an input node, an amplified signal node and an output. The input node is configured to receive a sinusoidal voltage signal and the output is configured to provide a half-wave current signal. A transistor having a gate, a source, and a drain is coupled to the input node. The input node is coupled to one of the source or the drain. The amplified signal node is coupled to the gate. A process tracking stabilizer is coupled to the transistor at the source or the drain not coupled to the input node. The process tracking stabilizer is configured to generate a control voltage for the transistor. The control voltage is configured to maintain a predetermined non-zero voltage at the input node of the converter circuit during a negative cycle of the sinusoidal voltage signal.

In various embodiments, a radiofrequency (RF) transceiver is disclosed. The RF transceiver includes an transformer and a voltage-to-current converter. The voltage to current converter includes a converter circuit having an input node, an amplified signal node and an output. The input node is configured to receive a sinusoidal voltage signal and the output is configured to provide a half-wave current signal. A transistor having a gate, a source, and a drain is coupled to the input node. The input node is coupled to one of the source or the drain. The amplified signal node is coupled to the gate. A process tracking stabilizer is coupled to the transistor at the source or the drain not coupled to the input node. The process tracking stabilizer is configured to generate a control voltage for the transistor. The control voltage is configured to maintain a predetermined non-zero voltage at the input node of the converter circuit during a negative cycle of the sinusoidal voltage signal.

In various embodiments, a radiofrequency (RF) transceiver is disclosed. The RF transceiver comprises an transformer coupled to a plurality of circuit paths and a plurality of voltage-to-current converters. Each of the plurality of circuit paths includes a voltage-to-current converter from the plurality of voltage-to-current converters. Each of the voltage-to-current converters includes a converter circuit, a PMOS transistor, and a process tracking stabilizer. The converter circuit has an input node, an amplified signal node, and an output. The input node is configured to receive a full-wave voltage signal. The PMOS has a gate, a source and a drain. The drain is coupled to the input node and the gate is coupled to the amplified signal node. The process tracking stabilizer is coupled to the source of the transistor. The process tracking stabilizer is configured to generate a process tracking voltage at the source. The process tracking stabilizer is configured to generate a control voltage for the PMOS. The control voltage is configured to maintain a predetermined non-zero voltage at the input node of the converter circuit during a negative cycle of the sinusoidal voltage signal.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A voltage-to-current converter, comprising:

a converter circuit having an input node, an amplified signal node and an output, wherein the input node is configured to receive a input voltage signal and the output is configured to provide a half-wave current signal;

a transistor having a gate, a source and a drain, wherein the input node is coupled to one of the source or the drain, and the amplified signal node is coupled to the gate, wherein the transistor provides current and maintains a predetermined non-zero voltage at the input node of the converter circuit during a negative cycle of the input voltage signal; and a process tracking stabilizer coupled to the transistor at an other of the source or the drain, wherein the process tracking stabilizer is configured to generate a control voltage for the transistor, and wherein the control voltage is configured to maintain a predetermined non-zero current at the output node of the converter circuit when the input voltage signal is substantially zero.

2. The voltage-to-current converter of claim 1, wherein the process tracking stabilizer comprises:

a current mirror coupled to a control current input;

a replica circuit coupled to the current mirror; and a voltage duplicator coupled to the current mirror and the replica circuit.

3. The voltage-to-current converter of claim 2, wherein circuit elements of the replica circuit and the converter circuit are substantially similar.

4. The voltage-to-current converter of claim 2, wherein the current mirror comprises a plurality of transistors.

5. The voltage-to-current converter of claim 2, wherein the voltage duplicator comprises a single-stage operational amplifier (op-amp).

6. The voltage-to-current converter of claim 1, wherein the output of the converter circuit is $$I_{out} = M * \frac{V_{in}}{R} + I_q \text{ when } I_{out} \geq 0; \text{ otherwise } I_{out} = 0$$

where M is a size ratio of the converter circuit, $V_{in}$ is an input voltage, R is a resistance of an input resistor, and $I_q$ is a control input of the process tracking stabilizer.

7. The voltage-to-current convertor of claim 1, wherein the transistor comprises a PMOS, and wherein the PMOS is coupled to the input node at the drain and the process tracking stabilizer at the source.

8. The voltage-to-current converter of claim 1, wherein the process tracking stabilizer is configured to correct for process variations of the conversion circuit and the transistor.

9. The voltage-to-current converter of claim 1, wherein the converter circuit generates a half-wave current signal at the output corresponding to a positive cycle of the input voltage.

10. A radiofrequency (RF) transceiver, comprising:

an transformer; and a voltage-to-current converter comprising:

a converter circuit having an input node, an amplified signal node and an output, wherein the input node is configured to receive a input voltage signal;

a transistor having a gate, a source and a drain, wherein the input node is coupled to one of the source or the drain, and the amplified signal node is coupled to the gate; and a process tracking stabilizer coupled to the transistor at an other of the source or the drain, wherein the process tracking stabilizer is configured to generate a control voltage for the transistor, and wherein the control voltage is configured to maintain a predetermined non-zero current at the output node of the converter circuit when t the input voltage signal is substantially zero.

11. The RF transceiver of claim 10, wherein the process tracking stabilizer comprises:

a replica circuit;

a current mirror; and a voltage duplicator.

12. The RF transceiver of claim 11, wherein circuit elements of the replica circuit and the converter circuit are substantially similar.

13. The RF transceiver of claim 11, wherein the current mirror comprises a plurality of transistor.

14. The RF transceiver of claim 11, wherein the voltage duplicator comprises a single-stage operational amplifier (op-amp).

15. The RF transceiver of claim 11, wherein the output of the voltage-to-current converter is $$I_{out} = M * \frac{V_{in}}{R} + I_q \text{ when } I_{out} \geq 0; \text{ otherwise } I_{out} = 0$$

where M is size ratio of the converter circuit, $V_{in}$ is an input voltage, R is a resistance of an input resistor, and $I_q$ is a control input of the process tracking stabilizer.

16. The RF transceiver of claim 10, wherein the transistor comprises a PMOS, wherein the PMOS is coupled to the input node at the drain and the process tracking stabilizer at the source.

17. The voltage-to-current converter of claim 10, wherein the process tracking stabilizer is configured to correct for process variations of the conversion circuit and the transistor.

18. The RF transceiver of claim 10, wherein the converter circuit generates a half-wave current signal at the output.

19. A RF transceiver, comprising:

an transformer coupled to a plurality of circuit paths;

a plurality of voltage-to-current converters, wherein each of the plurality of circuit paths includes a voltage-to-current converter from the plurality of voltage-to-current converters, each of the voltage-to-current converters comprising:

a converter circuit having an input node, an amplified signal node and an output, wherein the input node is configured to receive a input voltage signal;

a transistor having a gate, a source, and a drain, wherein the drain is coupled to the input node and the gate is coupled to the amplified signal node; and a process tracking stabilizer coupled to the source of the transistor, wherein the process tracking stabilizer is configured to generate a process tracking voltage at the source, wherein the process tracking stabilizer is configured to generate a control voltage for the transistor, and wherein the control voltage is configured to maintain a predetermined non-zero current at the output node of the converter circuit when the input voltage signal is substantially zero.

20. The RF transceiver of claim 19, where each of the process tracking stabilizers comprises:

a current mirror coupled to a control current input;

a replica circuit coupled to the current mirror; and a voltage duplicator coupled to the current mirror and the replica circuit.

* * * * *